United States Patent Office 3,829,393
Patented Aug. 13, 1974

3,829,393
COBALT OXIDE CATALYST
Derek James Sutherland Burleigh and Brian Desmond Hawkins, Stockton-on-Tees, England, assignors to Imperial Chemical Industries Limited, London, England
No Drawing. Filed Mar. 5, 1973, Ser. No. 337,848
Claims priority, application Great Britain, Mar. 23, 1972, 13,603/72
Int. Cl. B01j 11/22
U.S. Cl. 252—459     3 Claims

ABSTRACT OF THE DISCLOSURE

The sintering of cobalt oxide catalysts is facilitated by the use as sintering aid of from 1 to 10% by weight of a carboxylic acid selected from fumaric acid and compounds of the formula $R \cdot CO_2H$ where R is phenyl, p-methoxyphenyl, p-tolyl, o-hydroxyphenyl or diphenylmethyl, sintering being effected at a temperature above 500° C.

---

This invention relates to catalysts, more especially to sintered cobalt catalysts, to methods for their preparation and to their use in the synthesis of organic compounds.

It is already known to use reduced cobalt oxide catalysts in the synthesis of organic compounds, more particularly in the reduction of organic compounds with gaseous hydrogen and especially in so reducing organic nitriles to organic amines. An important instance is the reduction of adiponitrile to hexamethylene diamine which may be effected in the liquid phase under pressure by means of hydrogen in the presence of ammonia and a reduced cobalt oxide catalyst at a temperature which, for example, be in the range 50–200° C. The reduced cobalt oxide catalyst is obtained by pre-reducing a cobalt oxide catalyst, for example by heating in an atmosphere of hydrogen, optionally diluted with an inert gas such as nitrogen, at a temperature within the range 100 to 400° C.

The cobalt oxide catalyst is normally used in particulate form, for example in pelleted form, and is previously sintered in order to increase the physical strength of the catalyst particles, so prolonging the effective life of the catalyst by inhibiting physical breakdown of the catalyst during use. It is known to treat the catalyst particles with certain substances which act as sintering aids and improve the final strength of the particles. Such substances may also act as lubricants in, for example, the pelleting operation which may precede sintering. It is known to use glyceryl tristearate as such a sintering acid. It has also been proposed to use animal and vegetable stearins, and the higher fatty acids of chain length greater than $C_{12}$ and their esters, especially the esters with polyhydric alcohols such as glycol and glycerol.

It has also been proposed to use in the conversion of adiponitrile to hexamethylene diamine a reduced cobalt oxide catalyst, the activity of which has been increased by incorporation therein of a proportion, for example 0.1 to 0.5%, of silica. We have now found that improved sintered cobalt oxide catalysts may be obtained by the use of selected unsaturated carboxylic acids as sintering aids.

According to our invention we provide a process for the manufacture of a sintered cobalt oxide catalyst which comprises mixing cobalt oxide in particulate form with from 1 to 10% by weight of a carboxylic acid which is fumaric acid or a compound of the formula $R \cdot CO_2H$ in which R is phenyl, p-methoxyphenyl, p-tolyl, o-hydroxyphenyl or diphenylmethyl, and sintering at a temperature above 500° C.

The particulate cobalt oxide used in our invention may be obtained by calcining the cobalt carbonate or basic cobalt carbonate precipitated from a solution of a water-soluble cobalt salt. Cobalt nitrate may be used as the water-soluble cobalt salt and precipitation may be effected by addition of, for example, ammonium carbonate. After drying the cobalt carbonate, calcination to the oxide may be effected at a temperature within the range 100 to 500° C., for example at a temperature of 400° C. for 3 hours.

At this stage it is convenient to increase the density of the solid cobalt oxide, and one method of doing this is to wet-knead the oxide in a kneading machine followed by drying. If desired the cobalt oxide may then be granulated. By this means cobalt oxide granules having a bulk density greater than 1.0 g./ml., for example 1.0 to 1.8 g./ml., and more specifically 1.4 to 1.6 g./ml., may be obtained, and these are particularly suitable for use in the process of our invention. The granules may be of such a size as to pass a 2 mm. screen or possibly a 1 mm. screen, though larger particles may also be used. It is also possible, however, to effect increase in density of the solid cobalt oxide by other means, for example by roll compaction or by slugging.

The cobalt oxide may be shaped prior to sintering, for example it may be pelleted. If a shaping operation is adopted it is usually advantageous to mix the cobalt oxide with the carboxylic acid sintering aid prior to the shaping operating since the said acids act as lubricants during the shaping operation, and this use of the said acids forms a subsidiary feature of our invention.

The mixing of the cobalt oxide with the carboxylic acid sintering aid is conveniently effected in the solid state and any conventional mixing method may be used, for example, by tumbling in a mixing skip.

The amount of the said acid may be from 1 to 10% by weight, calculated on the weight of the cobalt oxide, and is preferably from 3 to 5% by weight.

Pelleting may be effected in a conventional pelleting machine. It is also possible to use shaped cobalt oxide in ball form. Although shaped cobalt oxide may be used in a wide variety of shapes and sizes, we prefer to use pellets, for example, cylindrical pellets, in the size range (1/16 inch to 1/4 inch) x (1/16 inch to 1/4 inch).

After mixing the cobalt oxide with the carboxylic acid sintering aid it is sintered by heating at a temperature above 500° C. Temperatures of sintering are normally in the range 500 to 1000° C., and preferably in the range 600 to 750° C. Generally speaking the lower the temperature of sintering the longer the time required, but the time usually varies between 1/4 hour and 12 hours. Sintering may, for example, be effected by passing the pellets continuously through a heated furnace. Typically the time of passage through the heated zone at a temperature of 650 to 700° C. will be 1/2 hour. During the sintering operation the bulk density of the cobalt oxide particles is increased, they acquire the desired pore structure and the crush strength is increased. The bulk density is normally greater than 1.8 g./ml., usually in the range 1.8 to 3.2 g./ml. and preferably in the range 2.0 to 2.5 g./ml.

Compared with particulate cobalt oxide which has been sintered after mixing with glyceryl tristearate as a sintering aid, the sintered particulate cobalt oxide obtained by the process of our invention has a higher crush strength and is equally effective when reduced and used as a catalyst in the conversion of adiponitrile to hexamethylene diamine. Although it is possible to improve the crush strength of particulate cobalt oxide sintered with glyceryl tristearate as sintering aid by increasing the bulk density, for example by increasing the temperature or time of sintering, this results in a diminution in the activity of the reduced catalyst in the manufacture of hexamethylene diamine. Particularly valuable carboxylic acid sintering aids of our invention are benzoic acid and salicylic acid.

It is also possible to apply the process of our invention to the manufacture of sintered cobalt oxide catalysts, the activity of which is promoted by incorporation therein of a proportion of silica, usually 0.1 to 0.5% by weight calculated on the weight of the cobalt oxide. In the manufacture of such catalysts it is preferred to add colloidal silica to aqueous cobalt nitrate solution prior to precipitation of cobalt carbonate. The subsequent steps in the manufacturing operation are then as previously described. The colloidal silica may be obtained, for example, by adding an acid, for example nitric acid, to an aqueous solution of a silicate, for example sodium metasilicate. Such silica-promoted sintered cobalt oxide catalysts of our invention have a higher crush strength than silica promoted cobalt oxide catalysts sintered with glyceryl tristearate as a sintering aid, but are equally effective when reduced and used as a catalyst in the conversion of adiponitrile to hexamethylene diamine.

The invention is illustrated but not limited by the following Examples in which the parts and percentages are by weight.

EXAMPLE 1

Preparation of Catalyst

Granulated cobalt oxide of bulk density 1.6 g./ml. and particle size less than 12 mesh (BSS) was mixed with 3% of its weight of benzoic acid by tumbling in a mixing skip for 1 hr. The so-treated cobalt oxide was then pelleted to give pellets of average size ¼ inch x ¼ inch. The pellets were then sintered by passing continuously through a heated furnace, the time of passage through the heated zone at 670° C. being ½ hr. The physical characteristics of the catalyst are given in the following Table.

EXAMPLE 2

Use of Catalyst

The catalyst pellets (21.4 g.) prepared as in Example 1 were charged to a container and the catalyst reduced by heating at 350 to 400° C. for 3 hours, in an atmosphere of hydrogen. The pellets were cooled to below 50° C. and discharged into methanol before transfer to a reactor to which 214 g. of adiponitrile and 139 g. of ammonia were also added. The reactor was filled with hydrogen to a pressure of 130 ats. and then heated to a temperature of 125° C. giving a maximum pressure of about 230 ats. The rate of hydrogen uptake was measured over a period of 2 hrs. and gave a measure of the catalyst activity.

EXAMPLE 3

Comparative Example

The method of Example 1 was repeated except that the granulated cobalt oxide was mixed with 3% of its weight of glyceryl tristearate. The physical characteristics of the catalyst are given in the following Table. The activity of the catalyst in the reduction of adiponitrile was assessed as in Example 2.

EXAMPLE 4

Comparative Example

A pelleted, granulated cobalt oxide catalyst containing 3% of glycerol tristearate as a sintering aid was prepared according to the method of Example 3 except that sintering was effected at 800° C. for ½ hr. to give a catalyst of higher crush strength but reduced activity. The physical characteristics of the catalyst are given in the following Table. The activity of the catalyst in the reduction of adiponitrile was assessed as in Example 2.

EXAMPLE 5

Preparation of Catalyst

Granulated cobalt oxide containing 2% of its weight of colloidal silica, and of bulk density 1.5 g./ml. and particle size less than 12 mesh (BSS) was mixed with 5% of its weight of benzoic acid, the mixture pelleted and the pellets sintered as described in Example 1. The physical characteristics of the catalyst are given in the following Table. The activity of the catalyst in the reduction of adiponitrile was assessed as in Example 2.

EXAMPLE 6

Comparative Example

The method of Example 5 was repeated except that the silica-containing granulated cobalt oxide was mixed with 3% of its weight of glyceryl tristearate. The physical characteristics of the catalyst are given in the following Table.

EXAMPLE 7

Preparation of Catalyst

The method of Example 1 was repeated except that the granulated cobalt oxide was mixed with 3% of its weight of p-anisic acid. The physical characteristics of the catalyst are given in the following Table.

EXAMPLE 8

The method of Example 1 was repeated except that the granulated cobalt oxide was mixed with 3% of its weight of fumaric acid and sintering was effected for 20 mins. at 800° C.

EXAMPLE 9

The method of Example 1 was repeated except that the granulated cobalt oxide was mixed with 3% of its weight of salicyclic acid and sintering was effected for 30 mins. at 690° C.

EXAMPLE 10

The method of Example 1 was repeated except that the granulated cobalt oxide was mixed with 3% of its weight of diphenylacetic acid and sintering was effected for 30 mins. at 690° C.

EXAMPLE 11

The method of Example 1 was repeated except that the granulated cobalt oxide was mixed with 3% of its weight of p-toluic acid and sintering was effected for 15 mins. at 700° C.

The physical characteristics of the catalysts of Examples 8 to 11 are given in the following Table.

| Ex. No. | Catalyst Sintering aid | Other characteristics | Bulk density, g./ml. | Surface area, m.²/g. | Pore volume, ml./g. | Crush strength, p.s.i. | Activity, ats./hr. |
|---|---|---|---|---|---|---|---|
| 1 | 3% benzoic acid | | 2.40 | 5.5 | 0.06 | 9,500 | 21 |
| 2 | do | | 2.33 | 6.8 | 0.06 | 8,200 | 29 |
| 3 | 3% glyceryl tristearate | | 2.09 | 9.4 | 0.08 | 5,200 | 21 |
| 4 | do | High crush strength | 2.60 | 4.9 | 0.05 | 7,700 | 15 |
| 5 | 5% benzoic acid | 2% silica | 2.09 | 25.5 | 0.09 | 6,800 | 57 |
| 6 | 3% glyceryl tristearate | do | 1.80 | 25.4 | 0.09 | 1,200 | |
| 7 | 3% p-anisic acid | | 2.30 | 4.51 | 0.06 | 4,000 | |
| 8 | 3% fumaric acid | | 2.11 | 1.35 | 0.070 | 5,800 | |
| 9 | 3% salicyclic acid | | 2.39 | 4.20 | 0.064 | 8,300 | |
| 10 | 3% diphenyl acetic acid | | 1.94 | 6.30 | | 3,500 | |
| 11 | 3% p-toluic acid | | 2.34 | | | 7,100 | |

What is claimed is:

1. A process for the manufacture of a sintered cobalt oxide catalyst which comprises mixing cobalt oxide in particulate form with from 1 to 10% by weight of a carboxylic acid which is fumaric acid or a compound of the formula $R \cdot CO_2H$ in which R is phenyl, p-methoxyphenyl, p-tolyl, o-hydroxyphenyl or diphenylmethyl, and sintering at a temperature above 500° C.

2. The process of Claim 1 in which the cobalt oxide and carboxylic acid is shaped prior to sintering.

3. The process of Claim 1 in which the cobalt oxide has incorporated therein from 0.1 to 0.5% by weight of silica to promote the activity of the catalyst.

References Cited

UNITED STATES PATENTS

| | | | |
|---|---|---|---|
| 2,776,315 | 1/1957 | Jefferson et al. | 252—459 X |
| 3,267,045 | 8/1966 | Isacks et al. | 252—472 X |

DANIEL E. WYMAN, Primary Examiner

W. J. SHINE, Assistant Examiner

U.S. Cl. X.R.

252—472; 260—583 K